United States Patent [19]

Urabe et al.

[11] Patent Number: 5,353,359
[45] Date of Patent: Oct. 4, 1994

[54] METHODS FOR GENERATING CHARACTER PATTERN DATA AND MAKING IMAGE

[75] Inventors: Akio Urabe; Koji Kinoshita; Hideaki Kitagawa; Noriyuki Kaneyasu; Akira Nihei, all of Tokyo, Japan

[73] Assignee: Ricoh Company, Ltd., Tokyo, Japan

[21] Appl. No.: 175,671

[22] Filed: Dec. 30, 1993

Related U.S. Application Data

[63] Continuation of Ser. No. 476,038, Feb. 6, 1990, abandoned.

[30] Foreign Application Priority Data

Feb. 9, 1989 [JP] Japan ................................. 1-30724
Apr. 17, 1989 [JP] Japan ................................. 1-97018

[51] Int. Cl.$^5$ ........................................ G06K 9/36
[52] U.S. Cl. ........................................ 382/41; 382/47; 358/458
[58] Field of Search ............... 382/41, 47, 22, 50, 382/54; 358/451, 458, 459; 348/561, 581

[56] References Cited

U.S. PATENT DOCUMENTS

| | | | |
|---|---|---|---|
| 4,553,173 | 11/1985 | Kawamura | 358/459 |
| 4,595,956 | 6/1986 | Kawamura et al. | 358/459 |
| 4,771,471 | 9/1988 | Kitamura | 358/166 |
| 4,797,943 | 1/1989 | Murayama et al. | 382/54 |
| 4,912,568 | 3/1990 | Shimano | 358/456 |

OTHER PUBLICATIONS

Karon, Peter, "Digital Formats for Typeface", URW Verlag, 1987.
Hersch, Roger D., "Character Generation under Grid Constraints", *Computer Graphics*, vol. 21, No. 4, Jul. 1987.
Hersch, Roger D., "Real Scan–Conversion of Shape Contours", *Computer Graphics*, 1987.
Gupta, Satish, et al., "Filtering Edges for Gray-Scale Displays", *Computer Graphics*, vol. 15, No. 3, Aug., 1981.
Carpenter, Loren, "The A-buffer an Anitaliased Hidden Surface Method", *Computer Graphics*, vol. 18, No. 3, Jul. 1984.
Kajiya, J. et al., "Filtering High Quality Text for Display on Raster Scan Devices" *Computer Graphics*, vol. 15, No. 3, Aug. 1981.

*Primary Examiner*—Yon J. Couso
*Attorney, Agent, or Firm*—Mason, Fenwick & Lawrence

[57] ABSTRACT

A method for generating character pattern data includes steps of providing contour information of a character having $m_1 \times m_2$ coordinate values in a coordinate space; and making and outputting gradated character pattern data of $l_1 \times l_2$ picture elements for an output device having n gradations per picture element (where $m_1$, $m_2$, $l_1$, $l_2$, and n are positive integers). In an image making method, picture subelements provided by dividing an original picture element are set as a scanning unit and an image is made by scanning conversion using the picture element having a gradation to perform a coloring operation with respect to the interior of a two-dimensional contour line. The image making method includes representing and processing a numeric value such as a coordinate value of a line segment constituting the contour line as a virtual real number having a decimal point in a word; providing positions for starting and completing the coloring operation easily by the representation of the virtual real number; and providing a brightness of a displayed picture element at a high speed by only adding an integer value to a region on one line in an output device.

5 Claims, 15 Drawing Sheets

CHARACTER PATTERN DATA WITH NO GRADATION (8×8 DOTS)

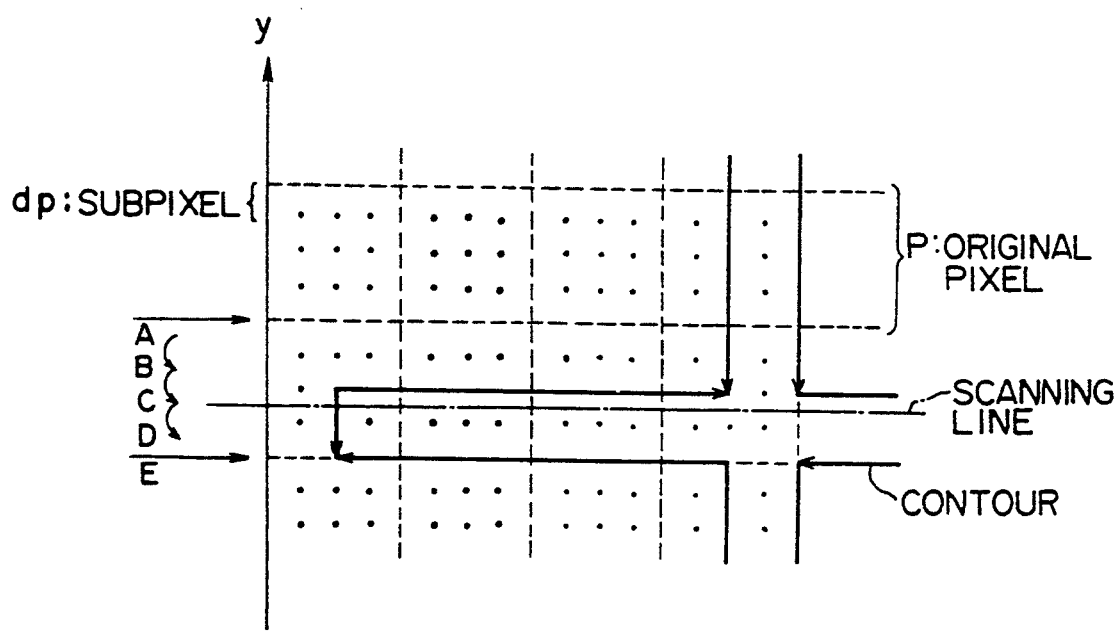

Fig. 5

GRADATED CHARACTOR PATTERN DATA
(16 GRADATIONS, 8x8 PICTURE ELEMENTS)

|   | 0 | 1 | 2 | 3 | 4 | 5 | 6 | 7 |
|---|---|---|---|---|---|---|---|---|
| 0 |   |   |   |   |   |   |   |   |
| 1 |   |   |   | 8 | 2 |   |   |   |
| 2 |   |   |   | 8 |   |   |   |   |
| 3 | 4 | 8 | 8 | 12| 8 | 8 | 12| 5 |
| 4 |   |   |   | 8 |   |   |   |   |
| 5 |   |   |   | 8 |   |   |   |   |
| 6 |   |   |   | 8 |   |   |   |   |
| 7 |   |   |   | 4 |   |   |   |   |

Fig. 6

GRADATED CHARACTOR PATTERN DATA
(16 GRADATIONS, 16X16 PICTURE ELEMENTS)

|    | 0 | 1 | 2 | 3 | 4 | 5 | 6 | 7 | 8 | 9 | 10| 11| 12| 13| 14| 15|
|----|---|---|---|---|---|---|---|---|---|---|---|---|---|---|---|---|
| 0  |   |   |   |   |   |   |   |   |   |   |   |   |   |   |   |   |
| 1  |   |   |   |   |   |   |   |   |   |   |   |   |   |   |   |   |
| 2  |   |   |   |   |   |   |   | 15| 5 |   |   |   |   |   |   |   |
| 3  |   |   |   |   |   |   |   | 16|   |   |   |   |   |   |   |   |
| 4  |   |   |   |   |   |   |   | 16|   |   |   |   |   |   |   |   |
| 5  |   |   |   |   |   |   |   | 16|   |   |   |   |   |   |   |   |
| 6  |   |   |   |   |   |   |   | 16|   |   |   |   | 3 | 10| 3 |   |
| 7  | 16| 16| 16| 16| 16| 16| 16| 16| 16| 16| 16| 16| 16| 16| 16|   |
| 8  |   |   |   |   |   |   |   | 16|   |   |   |   |   |   |   |   |
| 9  |   |   |   |   |   |   |   | 16|   |   |   |   |   |   |   |   |
| 10 |   |   |   |   |   |   |   | 16|   |   |   |   |   |   |   |   |
| 11 |   |   |   |   |   |   |   | 16|   |   |   |   |   |   |   |   |
| 12 |   |   |   |   |   |   |   | 16|   |   |   |   |   |   |   |   |
| 13 |   |   |   |   |   |   |   | 16|   |   |   |   |   |   |   |   |
| 14 |   |   |   |   |   |   |   | 16|   |   |   |   |   |   |   |   |
| 15 |   |   |   |   |   |   |   |   |   |   |   |   |   |   |   |   |

GRADATED CHARACTOR PATTERN DATA
(16 GRADATIONS, 16X16 PICTURE ELEMENTS)

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 |   |   |   |   |   |   |   |   |   |   |    |    |    |    |    |    |
| 1 |   |   |   |   |   |   |   | 5 | 1 |   |    |    |    |    |    |    |
| 2 |   |   |   |   |   | 5 |13 | 2 |   |   |    |    |    |    |    |    |
| 3 |   |   |   |   |13 | 3 |   |   |   |   |    |    | 12 | 3  |    |    |
| 4 | 3 | 6 | 6 | 6 | 6 | 8 |13 | 6 | 6 | 6 | 6  | 7  | 10 | 8  | 1  |    |
| 5 |   |   |   |   |11 | 3 |   |   |   |   |    |    |    |    |    |    |
| 6 |   |   |   |   |11 |   |   |   |   |   |    |    |    |    |    |    |
| 7 |   |   |   |12 | 3 |   |   |   |   |   | 10 | 1  |    |    |    |    |
| 8 |   |   | 8 | 7 |14 | 6 | 6 | 6 | 6 | 6 | 6  |14  | 8  |    |    |    |
| 9 |   | 6 | 7 |   |13 |   |   |   |   |   | 13 |    |    |    |    |    |
|10 |   | 3 | 7 |   |13 |   |   |   |   |   | 13 |    |    |    |    |    |
|11 | 1 | 5 |   |   |13 |   |   |   |   |   | 13 |    |    |    |    |    |
|12 |   |   |   |   |14 | 6 | 6 | 6 | 6 | 6 |14  |    |    |    |    |    |
|13 |   |   |   |   |13 |   |   |   |   |   | 13 |    |    |    |    |    |
|14 |   |   |   |   | 6 |   |   |   |   |   |    |    |    |    |    |    |
|15 |   |   |   |   |   |   |   |   |   |   |    |    |    |    |    |    |

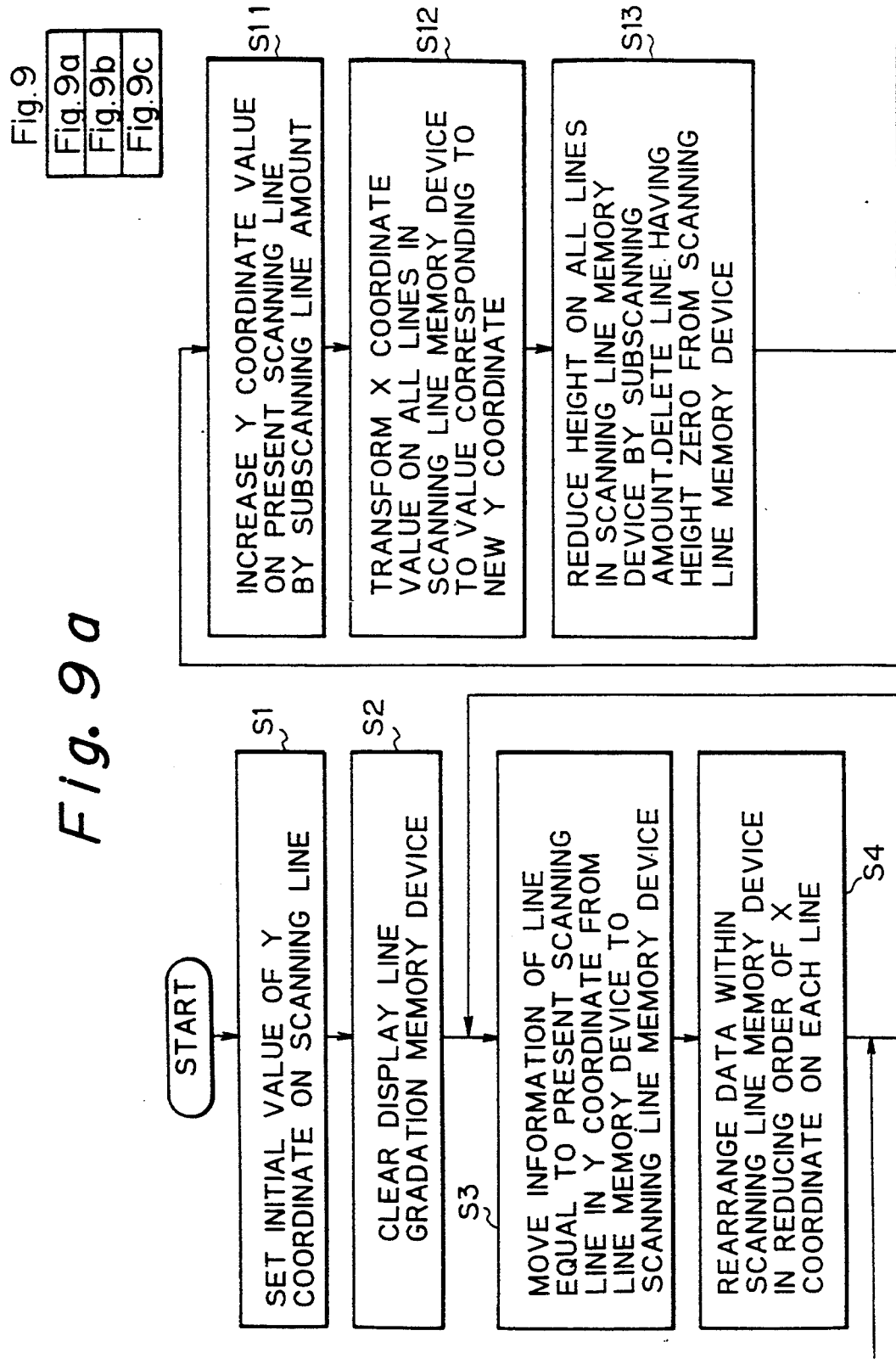

Fig.12

| | START POINT y | HEIGHT | x COORDINATE | INCREMENT |
|---|---|---|---|---|
| ① | 10 | 2 | 12 | -0.25 |
| ② | 10 | 5 | 12 | 0.15 |
| ③ | 10 | 2 | 20 | -0.25 |
| ④ | 10 | 5 | 20 | 0.15 |
| ⑤ | 12 | 5 | 10 | 0.2 |
| ⑥ | 12 | 5 | 20 | 0.2 |
| ⑦ | 15 | 2 | 15 | -0.125 |
| ⑧ | 15 | 2 | 25 | -0.125 |

Fig.13a

| HEIGHT | x COORDINATE | y COORDINATE VALUE 10 | INCREMENT |
|---|---|---|---|
| 2 | 12 | 12 | -0.25 |
| 5 | 12 | 12 | 0.15 |
| 2 | 20 | 20 | -0.25 |
| 5 | 20 | 20 | 0.15 |

Fig.13b

| | y COORDINATE VALUE 11 | |
|---|---|---|
| 1 | 11 | -0.25 |
| 4 | 12.6 | 0.15 |
| 1 | 19 | -0.25 |
| 4 | 20.6 | 0.15 |

Fig.13c

| | y COORDINATE VALUE 12 | |
|---|---|---|
| 0 | 10 | -0.25 |
| 3 | 13.2 | 0.15 |
| 0 | 18 | -0.25 |
| 3 | 21.2 | 0.15 |

Fig.13d

| | y COORDINATE VALUE 12 | |
|---|---|---|
| 5 | 10 | 0.2 |
| 3 | 13.2 | 0.15 |
| 5 | 20 | 0.2 |
| 3 | 21.2 | 0.15 |

| | x = 10 | 11 | 12 | |
|---|---|---|---|---|
| Fig.15(a) y=10 | 0 | 0 | 0 | ---- |
| Fig.15(b) 10.25 | 0 | 1 | 1 | ---- |
| Fig.15(c) 10.5 | 0 | 3 | 2 | ---- |
| Fig.15(d) 10.15 | 0 | 6 | 4 | ---- |
| Fig.15(e) 11 | 0 | 10 | 6 | ←RESULTS |
| Fig.15(f) 11 | 0 | 0 | 0 | ←CLEAR |
| Fig.15(g) 11.25 | 1 | 4 | 3 | ---- |
| Fig.15(h) 11.5 | 3 | 8 | 5 | ---- |
| Fig.15(i) 11.25 | 6 | 12 | 10 | ---- |
| Fig.15(j) 12 | 10 | 16 | 14 | ←RESULTS |

METHODS FOR GENERATING CHARACTER PATTERN DATA AND MAKING IMAGE

This is a continuation of U.S. patent application Ser. No. 476,038, filed Feb. 6, 1990, now abandoned.

BACKGROUND OF THE INVENTION

1. Field of the Invention

The present invention relates to a method for generating character pattern data to display a character of an arbitrary size in an output device such as a printer, a display, etc. The present invention also relates to a method for making an image by scanning conversion in which picture subelements are provided as a scanning unit by dividing an original picture element and the interior of a contour line is colored by using the picture element having a gradation.

2. Description of the Related Art

In a work station, etc., there is a case in which an operator would like to display a character such as a Chinese character of an arbitrary size in an output device such as a display, a printer, etc. In a method for holding and displaying normal dot character pattern data, it is necessary to hold the dot character data very size as to output the character of plural sizes (e.g., 24×24, 32×32, 40×40, etc.).

However, for example, in the case of size 24×24, 72 byte per one character are required even in the case of a character having no gradation. Accordingly, when 7000 characters are held as a total of first and second kinds of Japanese JIS Chinese characters, a memory of 504 k byte is used. In the case of size 40×40, a memory of 1.4 M byte is used. Therefore, when the characters of various kinds of sizes are simultaneously held in dot font, a large amount of memory is required and therefore it is not economical so much.

Accordingly, there is a proposed technique in which the character of an arbitrary size is displayed in the output device from a dot character pattern of one size. For example, Japanese Patent Application Laying Open (KOKAI) No. 62-286753 discloses a technique for converting a dot character pattern of a large size having no gradation to a gradated character pattern of a small size on the basis of plural dots constituting the character pattern. By using this technique, it is also possible to increase the number of displayed characters as much as possible in the output device having low resolution.

However, when the dot character pattern of a large size is held and the above-mentioned character conversion is performed, a large amount of memory is also required and it is not economical.

As a method for holding the character pattern data by a small amount of used memory, there is a technique in which only a contour line of the character is held as character data and dot character patterns of various kinds of sizes are made from information of this contour line and are outputted to the output device having no gradation.

This method for making the dot character patterns from the information of the contour line is shown in the following literatures for example.

1. "Digital Formats for Typeface" Peter Karou, URW Verlag, 1987.

2. "CHARACTER GENERATION UNDER GRID CONSTR-AINTS", Roger D. Hersch, Computer Graphics, Volume 21, Number 4, July 1987, and 3. "Trial for making font for preview", Yoshio Ohno, Document processing and Human interface, 21-5, 1988/11.

Accordingly, when the character pattern data are held as the contour line, it is possible to hold the characters at a high grade by a small amount of used memory. Further, when an affine transformation provided by the following formula, $$[x', y', 1] = [x, y, 1] * \begin{bmatrix} a & b & 0 \\ c & d & 0 \\ t_x & t_y & 1 \end{bmatrix}$$

is performed, an arbitrary modification including enlargement and reduction in size can be provided. Accordingly, by using this nature, it is possible to make the pattern data of the character of an arbitrary size from one contour.

As mentioned above, when the character pattern data are held as information of the contour line, it is possible to make the pattern data of the character of an arbitrary size from this information of the contour line. Here, the arbitrary size simply means that in mathematics and various kinds of problems are caused when the data are outputted to the actual output device.

Therefore, the third literature mentioned above proposed a technique for making the thickness of horizontal and vertical lines equal to each other on the contour. However, in such a method, their thicknesses are compulsorily changed so that the original shape of the character tends to be changed and a slight change between character styles is especially canceled.

The above problems are caused in the case of the output device having a low resolution and an intermediate resolution about 300 dot/inch. Therefore, even when the contour data of character styles with high accuracy are provided, the output results provided by the output device having a resolution less than the intermediate resolution are lower in quality than those in the dot character pattern data and thereby cannot be used in an output equipment so much.

A method for improving the quality of an image by utilizing a picture element having a gradation is known as an anti-allasing method. In this method, there are two basic methods composed of a post filtering method and a prefiltering method.

The pre-filtering method is a method for removing an unnecessary component of an image made by one kind of digital low pass filter and displaying the image. In this method, the digital filter is made by utilizing a Fourier transformation, but the calculating amount thereof is a very large so that it takes much time to perform the calculation. Accordingly, it is difficult to apply this method to a coloring operation with respect to a region surrounded by an arbitrary contour line.

On the other hand, in the post filtering method, an original picture element (a physical picture element) in a device for outputting an image is divided into virtual small picture subelements to make the image having a resolution higher than the original resolution, thereby providing a desirous resolution by utilizing the gradation. In principle, this method is inferior to the pre-filtering method, but has the advantages that a portion surrounded by the arbitrary contour line can be also colored by a combination of this method and the scanning conversion method.

When the image is made by the scanning conversion to which such a post filtering method is applied, the subelements correspond to bits and a processing is performed as a block of picture subelements with respect to the original picture element. The number of bits "1" in each block is counted to provide the gradation of the picture element finally outputted. Therefore, in this method, there are many calculations of bit units and therefore it is difficult to perform the processing at a high speed.

SUMMARY OF THE INVENTION

It is therefore a first object of the present invention to provide a method for generating character pattern data in which the amount of a used memory required to hold the character pattern is reduced and simultaneously a displayed character of an arbitrary size has a high quality when this character is displayed in an output device such as a printer, a display having a resolution less than an intermediate resolution, etc.

A second object of the present invention is to provide a method for making an image in which an image processing is performed at a high speed.

The above first object of the present invention can be achieved by a method for generating character pattern data comprising the steps of providing contour information of a character having $m_1 \times m_2$ coordinate values in a coordinate space where $m_1$ and $m_2$ are positive integers; and making and outputting gradated character pattern data of $l_1 \times l_2$ picture elements for a output device having n gradations per one picture element where $l_1$, $l_2$ and n are positive integers.

Further, in the above character pattern data generating method, when the gradated character pattern data of the $l_1 \times l_2$ picture elements are made, character data of $(\lceil \sqrt{n} \rceil \times l_1) \times (\lceil \sqrt{n} \rceil \times l_2)$ picture elements are virtually made where $\lceil \sqrt{n} \rceil$ designates a minimum integer not less than $\sqrt{n}$, and the gradation per one picture element is calculated by converting the character data to data of $l_1 \times l_2$ picture elements.

In this character pattern data generating method in accordance with the present invention, the character data are held as a contour line so that a character pattern with high accuracy can be held by a small amount of memory.

Further, the character is held as the contour line having the $m_1 \times m_2$ coordinate values in the coordinate space so that it is possible to deform this character to a character of an arbitrary size according to the output device by an affine transtormation, etc.

Further, in the present invention, since the gradated character pattern data are made from the information of the contour line of the character and are then outputted, it is possible to provide an outputted character having a high quality in comparison with the dot character pattern having no gradation and the same size.

The above second object of the present invention can be achieved by a method for setting picture subelements provided by dividing an original picture element as a scanning unit and making an image by scanning conversion using the picture element having a gradation to perform a coloring operation with respect to the interior of a two-dimensional contour line, the method comprising the steps of representing and processing a numeric value such as a coordinate value of a line segment constituting the contour line as a virtual real number having a decimal point in a word; providing positions for starting and completing the coloring operation easily by the representation of the virtual real number; and providing a brightness of a displayed picture element at a high speed by only adding an integer value to a region on one line in an output device.

In the above method, the numeric value such as a coordinate value of the line segment is treated as the virtual real number so that it is possible to perform a large amount of calculations in scanning conversion by an efficient integer calculation as described in detail in the following embodiments. Thus, the processings in this method can be performed at a high speed and the coordinate value, etc. can be extended to a real value without increasing the processing time, thereby increasing freedom of degree.

Further objects and advantages of the present invention will be apparent from the following description of the preferred embodiment of the present invention as illustrated in the accompanying drawings.

BRIEF DESCRIPTION OF THE DRAWINGS

FIG. 5 is a view showing an output example of the gradated character pattern data in the present invention;

FIG. 6 is a view showing an output example of the gradated character pattern data in a case in which the size of a picture element is changed;

FIG. 9 illustrates the relationship of FIGS. 9a, 9b and 9c. FIGS. 9a, 9b and 9c, which may be collectively referred to hereinafter as "FIG. 9⇌, constitute a schematic flow chart of processings in an image making method of the present invention;

FIG. 1 is an enlarged view of a portion surrounded by a broken line in FIG. 10;

FIG. 12 is a view showing stored contents in a line memory device;

FIGS. 13a to 13d are views showing stored contents in a scanning line memory device and changes therein;

FIGS. 15(a) through 15(j), which may be collectively referred to hereinafter as "FIG. 15", illustrate stored contents in a display line gradation memory device and changes therein.

DESCRIPTION OF THE PREFERRED EMBODIMENTS

The preferred embodiments of methods for generating character pattern data and making an image in the present invention will next be described in detail with reference to the accompanying drawings.

Figure 1A:
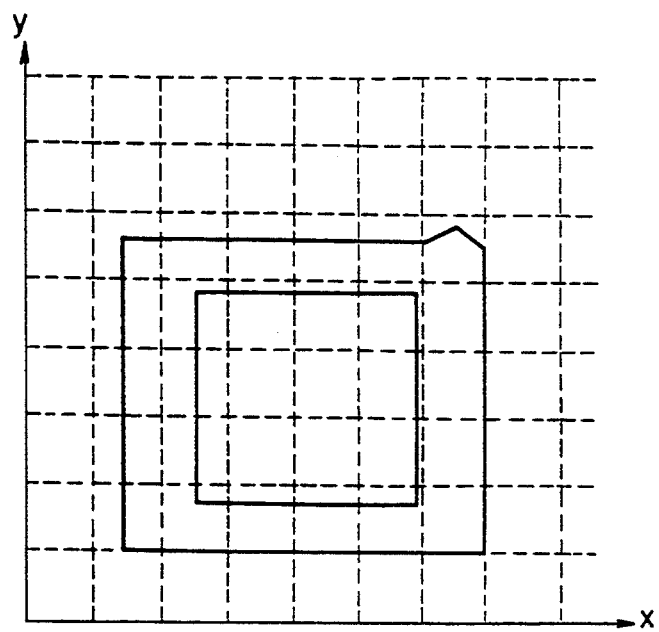
FIGS. 1a and 1b are views showing a data output example in a case in which dot character pattern data having no gradation are made from information of a contour line.
Figure 1B:
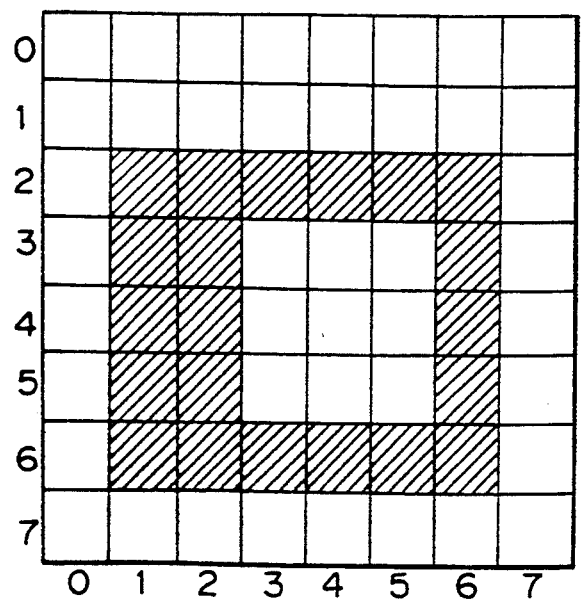

There is a problems when a character of a small size having no gradation is displayed especially in an output device having low resolution. For example, one of small squares surrounded by broken lines in FIG. 1a is set as a display unit in the output device having no gradation. Further, when a middle point of this square is located within the contour, this square is set to be black. In this case, as shown in FIG. 1a, vertical lines on the right-hand and left-hand sides with respect to character "□" originally have the same thickness. However, as shown in FIG. 1b, their thickness are finally different from each other so that the quality of an outputted character is very reduced. This problem is not limited to the Chinese characters, but a similar problem is caused in the case of alphabetical characters.

Figure 2:
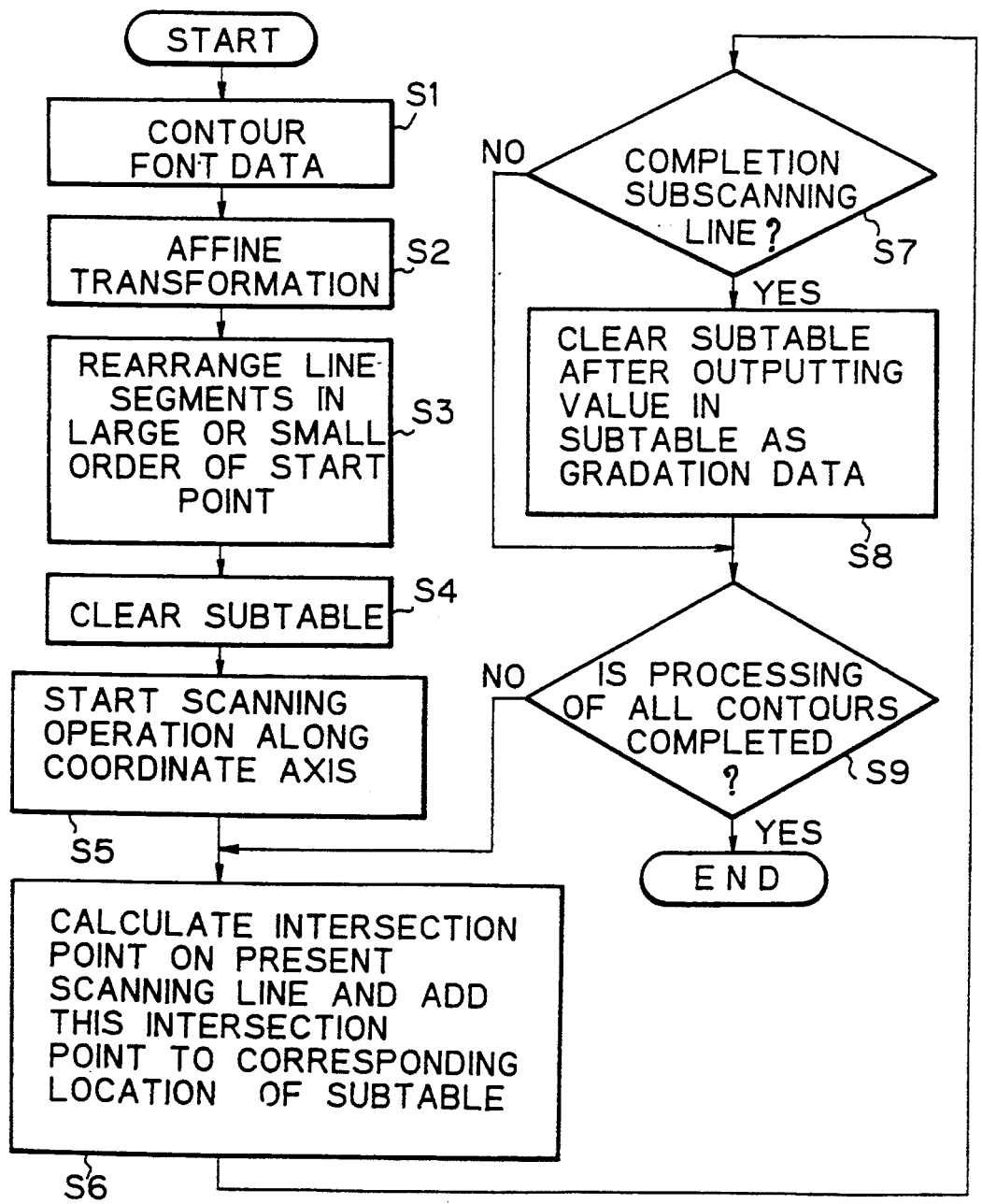
FIG. 2 is a flow chart for explaining a method for generating character pattern data in the present invention.

FIG. 2 is a flow chart for explaining the method for generating character pattern data in the present invention. FIGS. 3 and 4 are explanatory views showing a process until the formation of the character pattern data from information of a contour line.

Figure 3A:
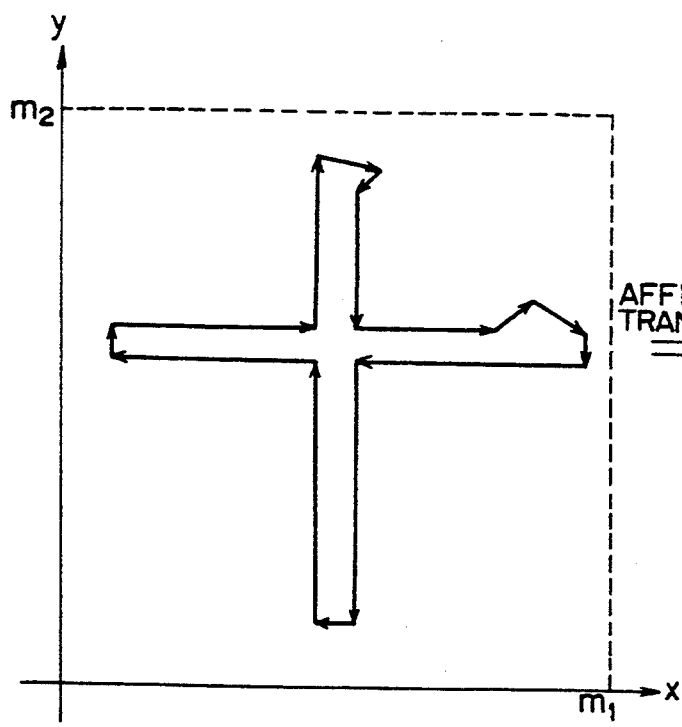
FIGS. 3a, 3b, and 3c (which may hereinafter be collectively referred to as "FIG. 3") and FIGS. 4a and 4b (which may hereinafter be collectively referred to as "FIG. 4") explanatory views showing a process until the formation of gradated character pattern data from information of the contour line of a character.

In step S1 in FIG. 2, data of a contour line of a character to be outputted (e.g., data of a contour line of character "+" shown in FIG. 3a) are called from a memory of a memory device. Data of various kinds of characters such as Chinese characters, other characters, etc. are stored in advance to the memory device in a computer, a work station, etc. as contour line data having $m_1 \times m_2$ coordinate values (e.g., $1024 \times 1024$ dot points, etc.) on x and y coordinates. As shown in FIG. 3a, the contour line of the character is divided into many vector-like line segments and each of these line segments can be represented by a start point and a terminal point on the coordinates. Therefore, the amount of a used memory is greatly reduced in comparison with that provided when the data are held as dot character pattern.

Figure 3B:
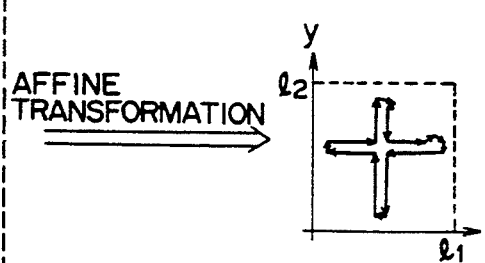

In steps S2, as shown FIG. 3b, the called contour line data of the character having the $m_1 \times m_2$ coordinate values are changed to a character pattern of a required size such as $l_1 \times l_2$ picture elements by the above-mentioned affine transformation.

Figure 3C:
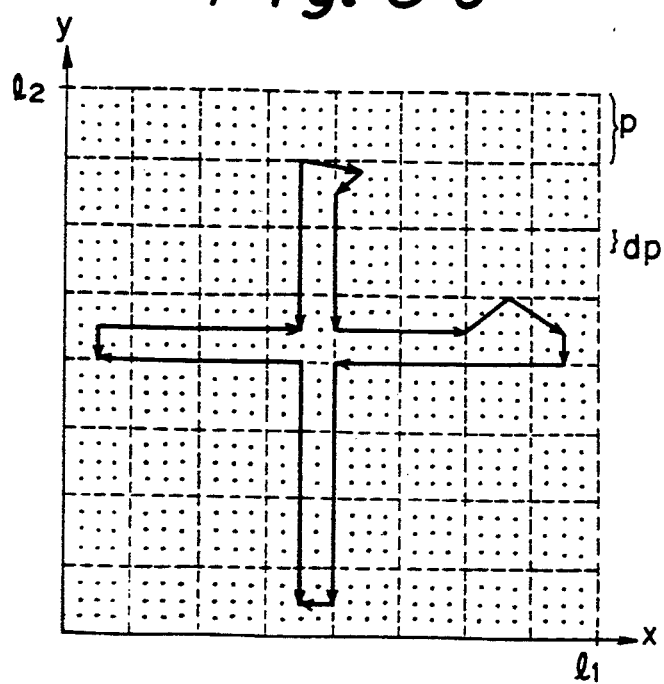

When the device for outputting the character pattern data provides n gradations, the pattern size is changed to $\lfloor \sqrt{n} \rfloor$ times the required size where $\lfloor \sqrt{n} \rfloor$ designates a minimum integer not less than $\sqrt{n}$. For example, in the case of 64 gradations, the integer $\lfloor \sqrt{n} \rfloor$ becomes 8. Therefore, when the original contour data are compressed to provide a reduced size 1/128, these data are virtually compressed to provide a reduced size 1/16 and a character transformation is then performed. Thus, with respect to the contour line, it is possible to perform the character transformation having an accuracy higher by $\lfloor \sqrt{n} \rfloor$ times than that provided when the affine transformation is simply performed. FIG. 3c shows an example in which the character pattern is changed to that having $8 \times 8$ picture elements and the output device is assumed to provide 16 gradations.

Next, it is assumed that a scanning line is parallel to the x axis and a moving direction of this scanning line is the y axis direction. In this case, in step S3, as mentioned above, all the line segments forming the contour of the character having a changed size ($\lfloor \sqrt{n} \rfloor \times l_1) \times (\lfloor \sqrt{n} \rfloor \times l_2$) are rearranged in a decreasing order shown in FIG. 3c from the start point (or the terminal point) having a larger value. Otherwise, all the line segments may be rearranged in an increasing order from the start point having a smaller value. Namely, this rearranging operation is performed such that the direction of the vector representing each of the line segements is the downward or upward direction along the y axis.

Next, it is considered that one picture element (which is called a pixel in the following description) P with respect to the original resolution of the output device is divided into $\lfloor \sqrt{n} \rfloor \times \lfloor \sqrt{n} \rfloor$ portions and these divided portions dp are set as subpixels.

As shown in FIG. 4a, the above-mentioned scanning line corresponding to one line of the subpixels dp is then considered and an intersection point between the scanning line and the contour is calculated. The number of subpixels from the intersection point on the scanning line to the next intersection point is then detected. Namely, the number of subpixels in a portion surrounded by the contour line is detected.

At this time, a table for waiting by one line for a location for the original resolution of the output device is disposed in the memory and is called a subtable in the following description.

As shown in FIG. 4a, in step S6, the scanning line is sequentially moved every subpixel unit from the upward direction to the downward direction along the y axis and the scanning operation is started in the decreasing order. Then, the intersection point between the scanning line and the contour is detected and the number of subpixels dp from this intersection point to the intersection point on the next contour line in the x axis direction is counted every pixel P in the scanning line direction i.e., in the x axis direction. The counted number of subpixels dp is then stored to the subtable set every pixel P. When the scanning line is located in a position shown by reference numeral A in FIG. 4a, the content of the subtable is set as item A in FIG. 4b. When the scanning line is moved from this state to a position shown by reference numeral B in FIG. 4a. the number of subpixels located between the intersection points of the contour line on the scanning line with respect to this position B is 0, 0, 0, 2,—from the left-hand every pixel. This result is added to the present subtable in step S6. Accordingly, when the scanning operation with respect to the positions A and B in FIG. 4a has been completely performed, the subtable values are provided as item B in FIG. 4b. Further, when the scanning line is moved from this state to a position shown by reference numeral C in FIG. 4a, the number of subpixels located between the intersection points of the scanning line and the contour line with respect to this position C is 2, 4, 4, 4,—from the left-hand side every pixel. This result is also added to the present subtable. Accordingly, when the scanning operation with respect to the positions A, B and C in FIG. 4a has been completely performed, the subtable values are provided as 2, 4, 4, 8,—shown in item C in FIG. 4b. Next, similar to the above operation, the scanning line is moved to a position shown by reference numeral D, the number of subpixels located between the intersection points of the scanning line and the contour line with respect to this position D is detected and added to the present subtable. Accordingly, when the scanning operation with respect to the positions A, B, C and D has been completely performed, the subtable values are 4, 8, 8, 12,—as shown by item D in FIG. 4b.

When the scanning line is moved from position D to position E, the scanning line exceeds a boundary of one original picture element on the output device side. Therefore, the subscanning operation per one picture element is completed and the detected results every picture element in the subtable are outputted as gradation data together with address information. In step S8, the subtable is then cleared and the above scanning operation us repeatedly performed in step S9 until the processings with respect to all the contour lines are completed.

Thus, the number of subpixels on the contour line detected every one pixel unit is written in the subtable and the values in this subtable determine the gradation of the corresponding pixel (picture element). Accordingly, the gradation of each picture element can be provided as the following formula. [gradation of output device]×[value of each element in subtable]/($\lfloor\sqrt{n}\rfloor \times \lfloor\sqrt{n}\rfloor$)

In the above formula, it is assumed that the color is white when the gradation is "0". However, when the color is black when the gradation is "0", the same results can be basically obtained if the obtained values are subtracted from the gradation of the output device.

FIG. 5 shows one example of the gradated character pattern data (16 gradation, 8×8 picture elements) provided as above. In FIG. 5, a number noted in a square representing each picture element shows a gradation of this picture element.

FIG. 6 shows an output example of the gradated character pattern data when character "+" is displayed as a character of a size having 16×16 picture elements in the output device having 16 gradations by the generating method of the character pattern data in accordance with the present invention.

FIG. 7 shows an output example of the gradated character pattern data when character "右 (right in Japanese)" is displayed as a character of a size having 16×16 picture elements in the output device having 16 gradations by the generating method of the character pattern data in accordance with the present invention.

Figures 7A, 7B:
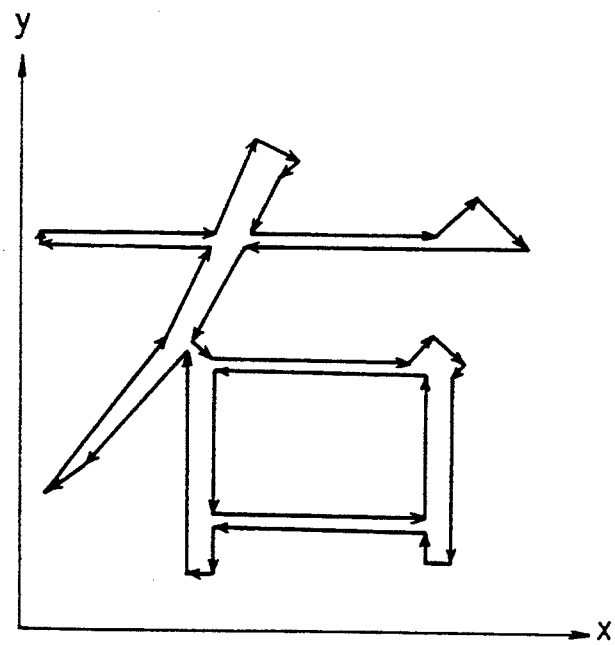
FIGS. 7a and 7b (which may be collectively referred to hereinafter as "FIG. 7") are views showing another output example of the gradated character pattern data in the present invention.

FIG. 7a shows the contour line of the character and FIG. 7b shows the gradated character pattern data after the above transformation.

As mentioned above, in the generating method of the character pattern data in the present invention, the character data are held as a contour line so that it is possible to hold the character pattern with high accuracy by using a small amount of memory.

Further, the character is held as the contour line having $m_1 \times m_2$ coordinate values in a coordinate space so that it is possible to change this character to a character of an arbitrary size according to the output device by the affine transformation, etc.

In the present invention, the gradated character pattern data are made from the information of the contour line of the character and are then outputted. Accordingly, the quality of the outputted character is higher than that of the dot character pattern having no gradation and the same size.

In the above embodiment, it is assumed that the output device provides white and black, but the present invention can be similarly applied when the output device provided a color.

Namely, in the case of the color, the color can be represented by a combination of numbers showing densities of a plurality of colors such as three primary colors in light composed of red, green and blue in a display, etc., three primary colors composed of cyan, magenta and yellow, four colors composed of cyan, magenta, yellow and black in a printer, etc. Accordingly, the above formula is calculated with respect to the numbers showing the densities of the respective colors such as red, green and blue to provide the gradation every color.

As mentioned above, it is assumed that the background for displaying the character is white in the above formula. When this background is not white, the above formula is deformed to the following formula in consideration of the color of the background so that it is possible to obtain the gradated character pattern data corresponding to the background from this formula.

$$R = B \times (A-I)/A + C \times I/A$$

where R designates a gradation or color provided as a result, B the present gradation or color with respect to a picture element to be outputted, A $\lfloor\sqrt{n}\rfloor \times \lfloor\sqrt{n}\rfloor$, I a value of each element in the subtable, and C designates a gradation or color to be outputted.

As mentioned above, in accordance with the present invention, the character data are held as a contour line so that a character pattern with high accuracy can be held by a small amount of memory in comparison with the case in which the character data are held as dot characters. Further, the character is held as the contour line having $m_1 \times m_2$ coordinate values in a coordinate space so that it is possible to easily deform this character to a character of an arbitrary size according to the output device by the affine transformation, etc.

Further, in the present invention, since the gradated character pattern data are made from the information of the contour line of the character and are then outputted, it is possible to provide an outputted character having a high quality in comparison with the dot character pattern having no gradation and the same size.

Furthermore, in the present invention, the gradated character pattern data can be generated in the output device of a monochromatic type as well as the output device of a color type.

A method for making an image in one embodiment of the present invention will next be described in detail with reference to FIGS. 8 to 16.

Figure 8:
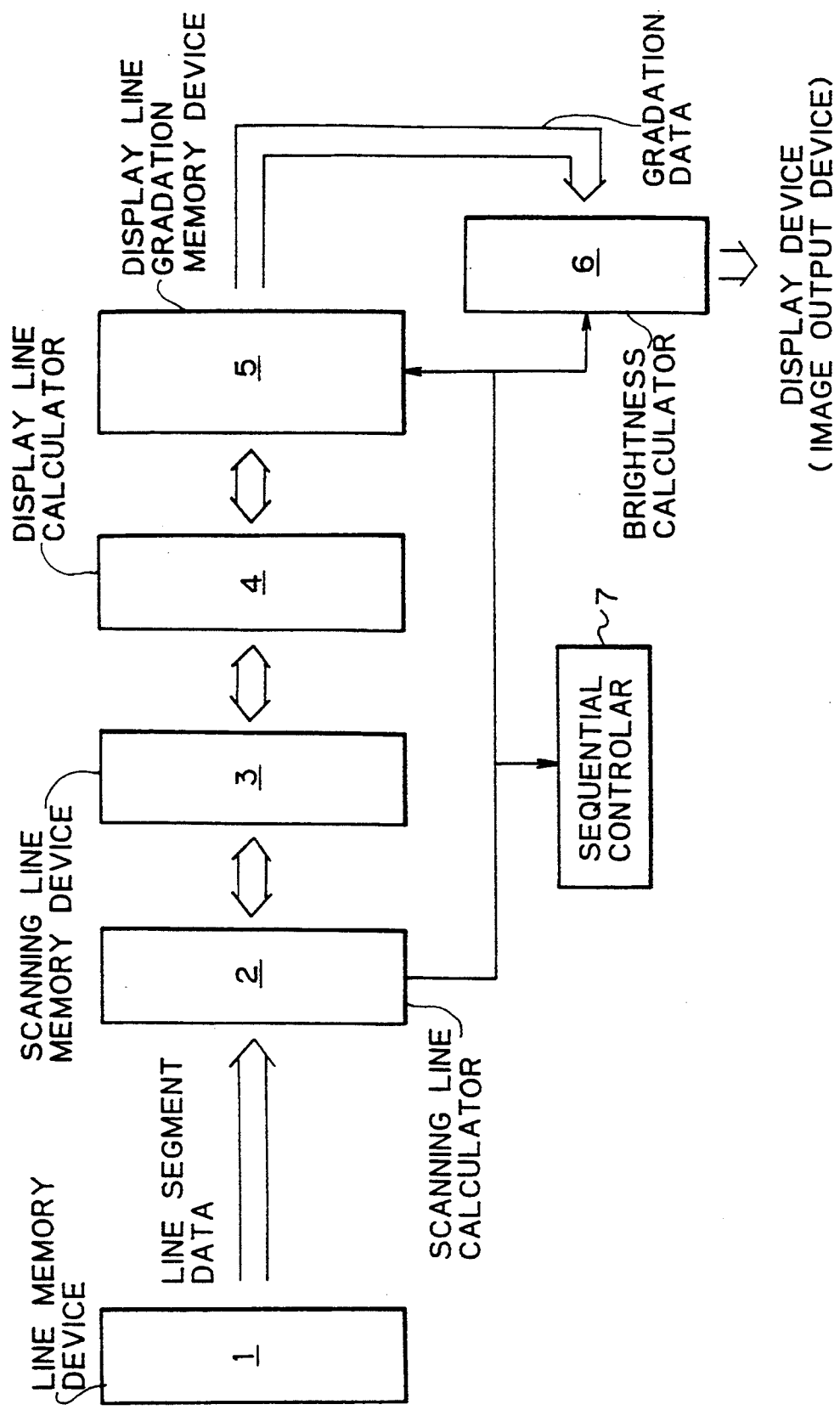
FIG. 8 is a schematic block diagram showing an apparatus for making an image in one embodiment of the present invention.
Figure 9B:
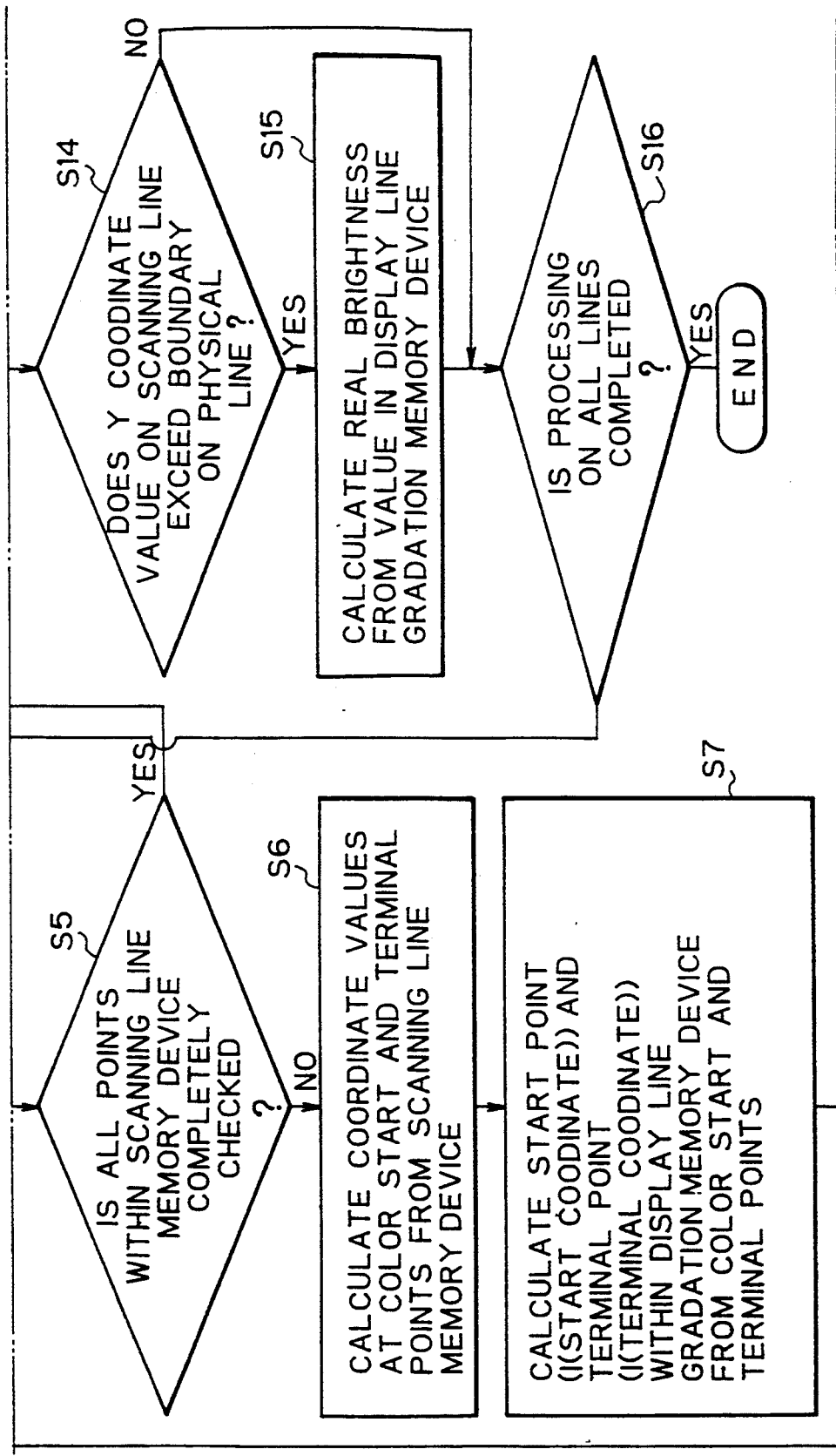
Figure 9C:
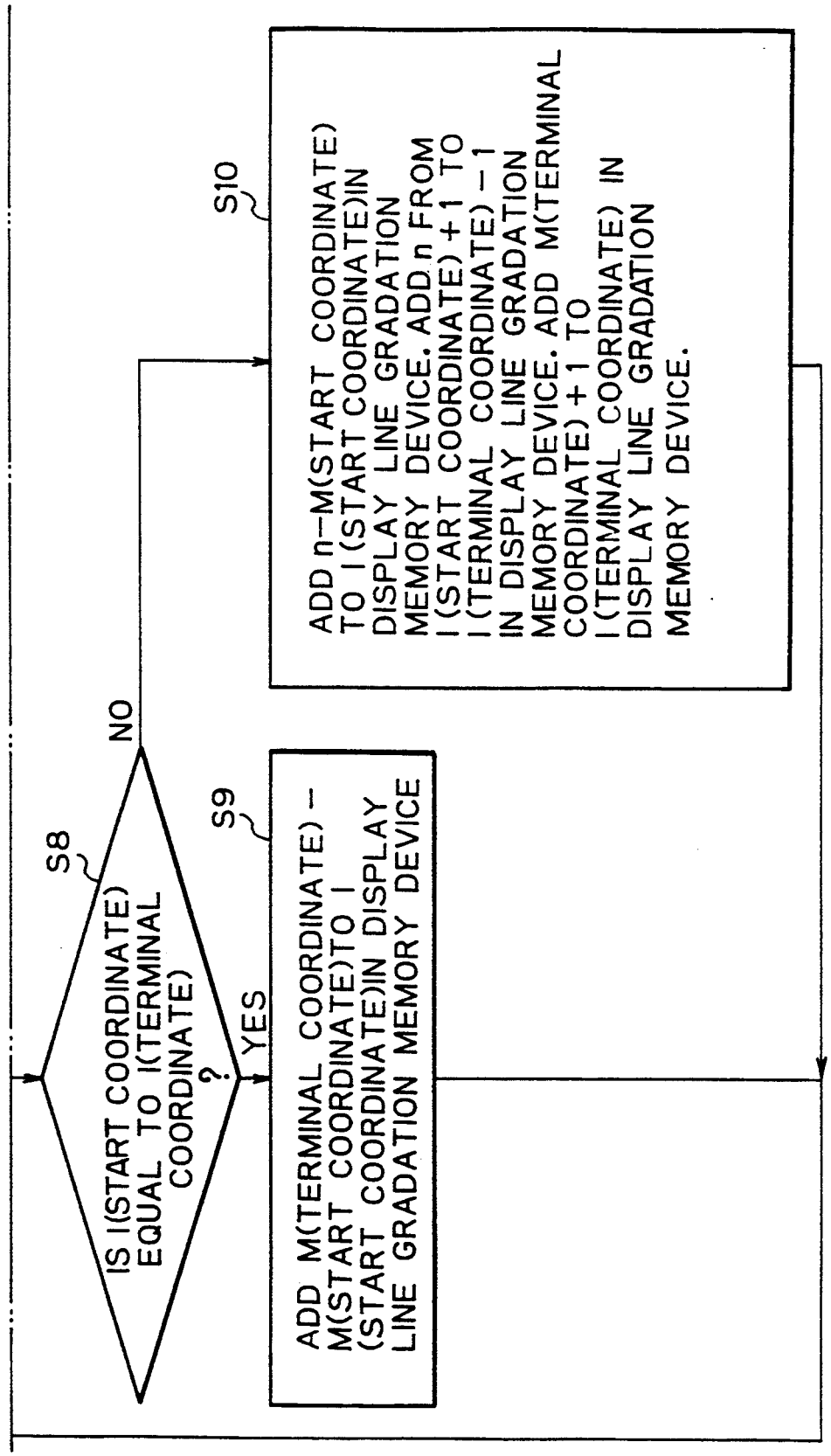

In this embodiment of the present invention, as shown in FIG. 8, an apparatus for making an image is constructed by a line memory device 1, a scanning line calculator 2, a scanning line memory device 3, a display line calculator 4, a display line gradation memory device 5, a brightness calculator 5 and a sequential controller for controlling a sequence of processings by the respective calculators. In this apparatus, a scanning conversion is performed every picture subelement unit with respect to the interior of two-dimensional contour lines having a polygonal shape and represented by data within the line memory device 1. A coloring operation with respect to this interior is then performed by using a picture element having a gradation. Gradation data every physical picture element are provided to the display line gradation memory device 5 and the brightness calculator 6 calculates a real brightness from these gradation data and outputs the calculated results to a display device (an image output device). FIG. 9 shows a schematic flow chart of these processings.

Figure 10:
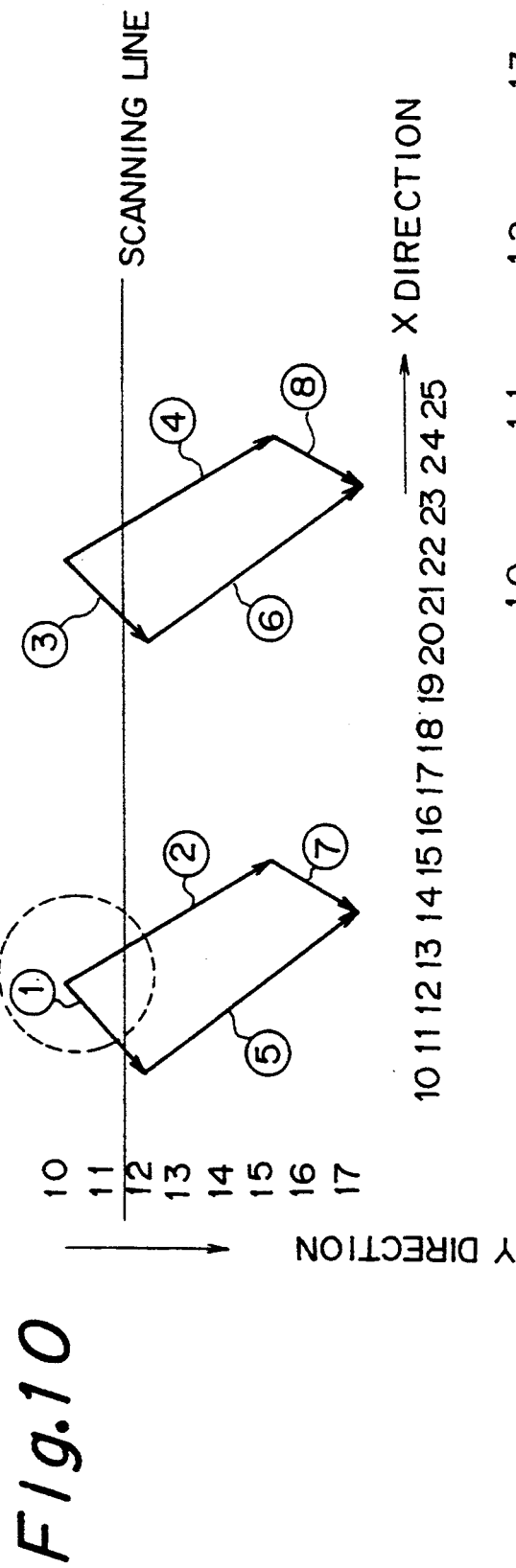
FIG. 10 is a view showing an example of a contour line.
Figure 11:
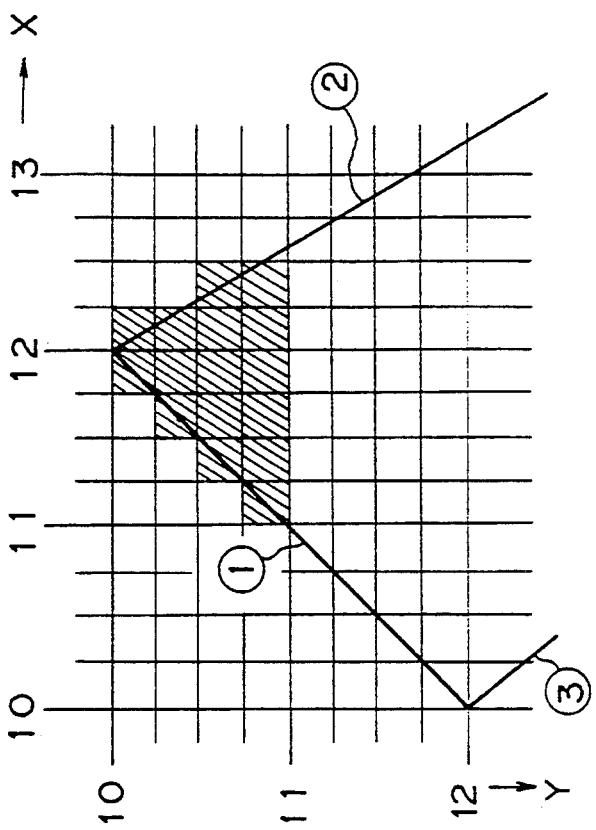

The processing contents will next be described in detail when an image having the colored interior of a contour line as shown in FIG. 10 is made as an example. FIG. 11 is an enlarged view of a portion surrounded by a broken line in FIG. 10.

In a scanning conversion method, a virtual line as a scanning line is moved and an intersection point between the scanning line and the contour line is calculated and a region judged as an inside region of the contour line is colored. Here, the scanning line is moved from the upward direction to the downward direction, i.e., in an increasing direction of y coordinate. However, the scanning line may be moved in the opposite direction.

All line segments constituting the contour line as an example are constructed by straight lines, but may be constructed by curves if the next point can be calculated when the scanning line is moved. All the line segments on the contour line have integer values with respect to the coordinates of start and terminal points, but are not limited to the integer values. In the following description, it is assumed that a smaller end point of the y coordinate is the start point and the other end point is the terminal point with respect to all the line segments on the contour line. However, the opposite arrangement may be used when all the line segments are directed in the same direction.

Data of such line segments on the contour line are rearranged in a sequential order in which the y coordinate value at the start point is small and are stored to the line memory device 1. The data of the line segments include at least the y coordinate value at the start point, its height until the terminal point, the x coordinate value at the start point, and an increment (or a decreasing amount) of the x coordinate provided when the scanning line is moved by the height of a picture subelement.

Here, it is assumed that a display device (an image output device) having 15 gradations for an output is used. Accordingly, an original picture element (a physical picture element) in the display device is divided into 4×4 picture subelements. In general, when the image output device has N gradations and a minimum integer not less than $\sqrt{N}$ is designated by $\lfloor \sqrt{n} \rfloor$ and is set to n, it is sufficient to divide one physical picture element into n×n picture subelements.

Such subelements are provided as a moving unit (a scanning unit) on the scanning line. Namely, one physical line is virtually scanned as n lines as shown in FIG. 11.

Here, since n=4 is set, line segments ① to ⑧ constituting the contour lines shown in FIG. 10 are stored to the line memory device 1 as shown in FIG. 12.

Figure 14:
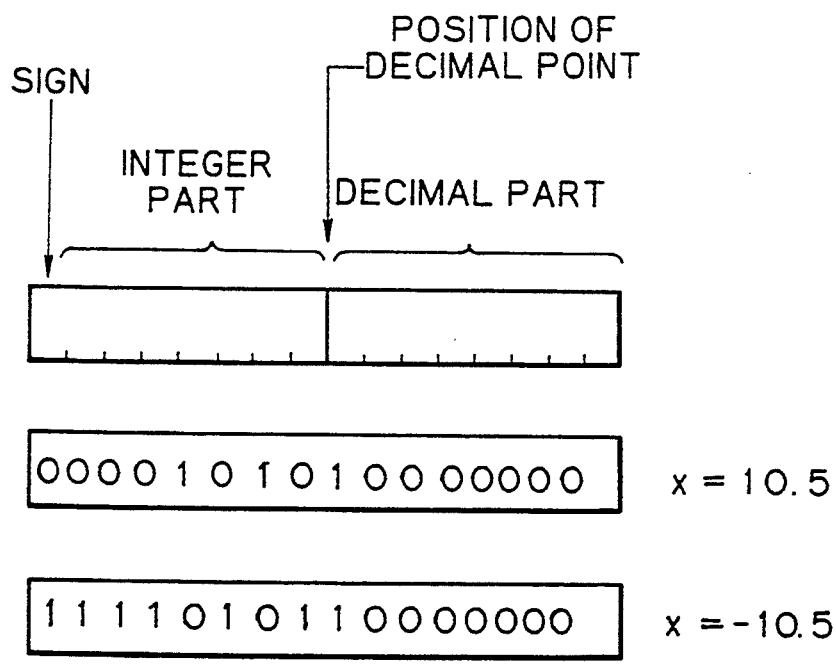
FIG. 14 is a view showing representation forms of numeric values of an x coordinate, etc.

The respective data of the line segments within the line memory device 1 are generally represented in the form of an integer or a floating point. However, here, as shown in FIG. 14, a virtual decimal point is located in an intermediate position of one word and integer and decimal parts are respectively located on the left-hand and right-hand sides of the decimal point, thereby constituting a virtual real number. The data such as coordinate values of the line segments, etc. are represented and processed as this virtual real number. A bit at the left-hand end of the word is set to a sign bit and a negative number is represented by a complement of 2 which is the same as the integer. The data within the scanning line memory device 3 are similarly represented.

In this case, the virtual decimal point is located in the intermediate portion of the word having the decimal point. However, in general, it is sufficient to locate the decimal point in a position in which the integer part has bits equal to or greater than $\log_2 N$ bits in the case of the display device having N gradations.

In such a numerical representation form, it is possible to perform addition and subtraction by a normal integer calculation. Accordingly, the calculating time can be shortened in comparison with the floating point calculation and is not increased in comparison with the case in which the coordinate value is limited to the integer. It takes time to perform multiplication and division in comparison with the integer calculation, but it takes less time to perform multiplication and division in comparison with the floating point calculation. However, the number of multiplications and divisions is much smaller than that of additions and subtractions so that the calculating time can be neglected. Accordingly, in accordance with the present invention, the coordinate value can be extended to a real value without increasing the calculating time.

In the following description, the data of such contour lines are assumed to be stored to the line memory device 1 and the processings of the image generating method will next be described sequentially.

First, in steps S1 and S2 in FIG. 9, an initial value of the y coordinate on the scanning line is set in the scanning line calculator 2 and the display line gradation memory device 5 is cleared in the display line calculator 4.

Next, in steps S3 and S4 in FIG. 9, the scanning line calculator 2 moves the data of height, x coordinate value and increment with respect to all the line segments in which the y coordinate value at the start point is equal to the y coordinate value on the present scanning line from the line memory device 1 to the scanning line memory device 3. The data within the scanning line memory device 3 are rearranged in a sequential order in which the x coordinate value is small.

In the case of the contour lines in FIG. 10, when the y coordinate value on the present scanning line is set to 10, the stored contents of the scanning line memory device 3 are provided as shown in FIG. 13a.

The data of the x coordinate values of such contents in the scanning line memory device 3 are searched by the scanning line calculator 2 and the x coordinate values of the start and terminal point in a coloring interval on the present scanning line are searched in step S6. In steps S4 to S10, the coloring processing in the coloring interval is performed with respect to the display line gradation memory device 5 by the display line calculator 4. When this processing is completed and this completion is judged in step S5, the y coordinate value on the scanning line is increased by the height there, 0.25) of the picture subelement by the scanning line calculator 2. Namely, the scanning line is moved as the picture subelement unit in step S11. Then, in steps S12 and S13, the data of the height stored to the scanning line memory device 3 are decreased by 0.25 in height by the scanning line calculator 2. Further, an increment is added to the data of the x coordinate values and the data of the line segments having height zero are deleted by the scanning line memory device 3. In the steps S3 and S4, when the scanning line is moved to a boundary on the physical line, the data of the line segments, in which the present scanning line is in conformity with the y coordinate value at the start point, are moved by the scanning line calculator 2 to the scanning line memory device 3 from the line memory device 1. The data of the line segments within the scanning line memory device 3 are rearranged in a sequential order that the x coordinate value is small.

Accordingly, when the y coordinate value on the scanning line is increased until number 11, the stored contents of the scanning line memory device 3 are provided as shown in FIG. 13b. When the y coordinate value on the scanning line is increased until number 12, the stored contents of the scanning line memory device 3 are provided as shown in FIG. 13c. The data of the line segments ① and ⑧ in FIG. 10 having height zero are deleted by the scanning line memory device 3. Thereafter the data of the line segments ⑤ and ⑥ in FIG. 10 are added to the scanning line memory device 3 and are then rearranged. The stored contents of the scanning line memory device 3 are provided as shown in FIG. 13d.

In the step S6, the coloring interval is detected by searching the x coordinate values within the scanning line memory device 3 in the stored order. For example, with respect to the scanning line having y coordinate value 11, as can be seen from FIG. 13b, it is sufficient to perform the coloring operation with respect to the interval point x=11 to point x=12.5 and the interval from point x=19 to point x=20.6.

The coloring operation in such intervals is performed by adding a required value to the corresponding stored value within the display line gradation memory device 5. Accordingly, while the scanning line is moved, the stored contents of the display line gradation memory device 5 are sequentially changed. In the case of the contour lines shown in FIG. 11, the stored contents of the display line gradation memory device 5 are sequentially changed by the movement of the scanning line as shown in FIG. 15.

As can be seen from FIG. 11, one picture subelement of the picture element at x=11 and one picture subelement of the picture element at x=12 should be colored on the scanning line at y=10.25. Accordingly, as shown by item (b) in FIG. 15, number 1 is added to the stored values in positions corresponding to x=11 and x=12 in the display line gradation memory device 5. Similarly, two picture subelements of the picture element at x=11 and one picture subelement of the picture element at x=12 should be colored on the scanning line at y=10.5. Accordingly, as shown by item (c) in FIG. 15, number 2 is added to the stored value in a position corresponding to x=11 in the display line gradation memory device 5 and number 1 is added to the stored value in a position corresponding to x=12.

The added number and the position for performing this addition can be simply calculated as follows since the x coordinate values within the scanning line memory device 3 are represented as virtual real number data in which the virtual decimal point is located in the word as mentioned above.

When the divided number n of the physical picture element in the x and y directions is set to a power of 2 as mentioned above (here, n=4 is set), the position for adding a number in the display line gradation memory device 5 is provided from the integer part of the x coordinate data. The added number is provided from $\log_2 n$ bits (here, 2 bits since n=4 is set) on the right-hand side from the decimal point of the x coordinate data.

Figure 16A:
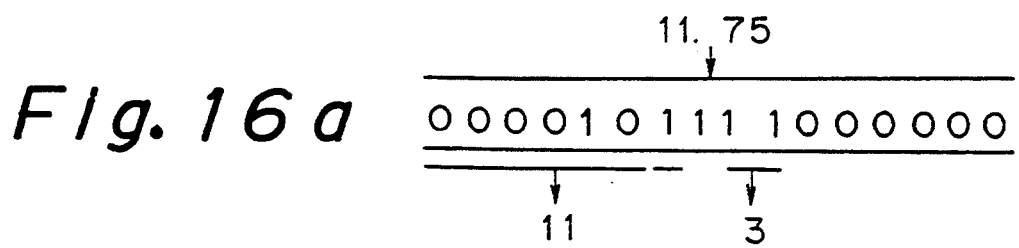
FIG. 16a and 16b are views showing an example of x coordinate data.
Figure 16B:
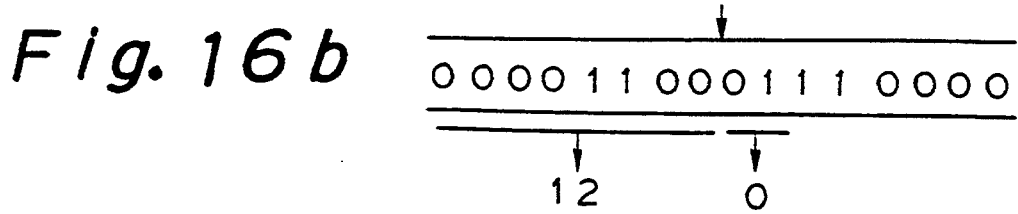

For example, in the case of the contour lines in FIG. 11, with respect to the scanning line at y=10.25, the x coordinate value at a color start point is 1.75, and the x coordinate value at a color terminal point is 12.1875 and the completion of this processing is detected in step S16. The words of these data are provided as shown in FIGS. 16a and 16b. The color start position in the display line gradation memory device 5 is a position at x=11 since the integer part of the word shown in FIG. 16a indicates number 11 by decimal notation. The added number is 1 (=n−3) since two bits on the right-hand side of the decimal point indicate number 3 by decimal notation and n=4 is set as mentioned above. The color terminal position in the display line gradation memory device 5 is a position at x=12 since the integer part of the word shown in FIG. 16b indicates number 12 by decimal notation. Therefore, the added number is 1 since two bits on the right-hand side of the decimal point indicate number 0 by decimal notation.

Step S7 in FIG. 9 shows a processing for calculating the above color start and terminal positions in the display line gradation memory device 5. Steps S8 to S10 in FIG. 9 show processings for calculating the added number and adding this added number to the corresponding data in the display line gradation memory device 5.

Here, the $\log_2 n$ bits on the right-hand side of the decimal point of the x coordinate data are represented as M (x coordinate) and the integer part thereof is represented as I (x coordinate). The corresponding position in the display line gradation memory device 5 is represented as L[i].

In the step S8, integer part I (start coordinate) and integer part I (terminal coordinate) are compared with each other. When these integer parts are equal to each other, it proceeds to the step S9. When these integer parts are not equal to each other, it proceeds to the step S10.

In the step S9, bits M (terminal coordinate) minus bits M (start coordinate) is added to the stored value in position L[(start coordinate)].

In the step S10, the following processings are performed.

a) A value n=M (start coordinate) is added to the stored value in the position L[I(start coordinate)].

b) The value n is added to each of the stored values in respective positions L[I(start coordinate) <i< I(terminal coordinate)].

c) A value M (terminal coordinate)+1 is added to the stored value in position L[I(terminal coordinate)].

The operation for taking the bits M (x coordinate) and the integer part I (x coordinate) out of the x coordinate data is constructed by a simple calculation and therefore the time required to perform this operation is short.

When the above processing with respect to one physical line has been completed and the y coordinate value on the scanning line exceeds the boundary on the physical line and this state is judged in step S14, the brightness calculator 6 calculates a brightness B of each picture element on this line from the data within the display line gradation memory device 5 by the following formula, and outputs the calculated brightness to the display device (image output device) in step S15.

$$B = (\times N + (A - I) \times C)/A$$

where I designates a corresponding stored value in the display line gradation memory device 5, $A = n \times n$, N a gradation of the display device (image output device), and C designates a gradation of the picture element outputted to the display device.

The above calculation is also constructed by an integer calculation and therefore is performed at a high speed.

When the coloring operation is performed at an intermediate gradation, it is sufficient to change the value N. In the case of a color image, similar processings are performed to provide the brightness with respect to each of colors red, green and blue; cyan, magenta and yellow; or cyan, magenta, yellow and black, etc.

In the above embodiment, the scanning line is moved in the y direction, but may be moved in the x direction. In this case, x and y are replaced with each other in the above description.

Each of the memory devices and each of the calculators shown in FIG. 8 may be respectively constructed physically by a single device.

As mentioned above, in accordance with the present invention, the coloring interval can be determined and the operation for calculating the gradation can be performed by an efficient integer calculation so that it is possible to perform the processing for making the image at a high speed in comparison with that in the conventional method.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for generating character pattern data using an apparatus having an electronic memory, an electronic processor, and an output device having n gradations per picture element, the method comprising the steps of:
   a) reading from the electronic memory point data representing contour information of a character stored in the electronic memory and having $m_1 \times m_2$ coordinate values in a coordinate space from the electronic memory, wherein $m_1$ and $m_2$ are positive integers;
   b) using the electronic processor:
   1) virtually making character data of $(\lfloor \sqrt{n} \rfloor \times l_1) \times (\lfloor \sqrt{n} \rfloor \times l_2)$ picture elements from the point data read from the electronic memory; and
   2) forming gradated character pattern data of $l_1 \times l_2$ picture elements for the output device that has n gradations per picture element by converting the virtually made character data of $(\lfloor \sqrt{n} \rfloor \times l_1) \times (\lfloor \sqrt{n} \rfloor \times l_2)$ picture elements to data of $l_1 \times l_2$ picture elements, the gradated character pattern data also having n gradations per picture element; wherein:
   i) $l_1$, $l_2$ and n are positive integers; and
   ii) $\lfloor \sqrt{n} \rfloor$ designates a minimum integer not less than $\sqrt{n}$; and
   c) outputting to the output device that has n gradations per picture element the gradated character pattern data.

2. The method of claim 1 wherein the forming step includes:
   converting the character data into data of $l_1 \times l_2$ picture elements.

3. A method for setting a brightness of respective picture elements of an image using an apparatus having a scanning device, an electronic memory, and an output device having n gradations per picture element, the method comprising the steps of:
   a) using the scanning device, scanning picture sub-elements in a direction along one coordinate axis of two-dimensional coordinate axes on contour lines of the image, the picture sub-elements being set by virtually dividing the respective picture elements with respect to one direction along one coordinate axis of the two-dimensional coordinate axes and another direction along another coordinate axis of the two-dimensional coordinate axes;
   b) calculating respective numeric values of two-dimensional coordinates on contour lines of the image by using the electronic processor as the picture sub-elements are scanned by the scanning device;
   c) with the electronic processor, detecting the number of the picture sub-elements with respect to the respective picture elements, wherein at least part of the picture sub-elements are included in an inside region of the image defined by the contour lines of the image, based on (1) scanned results of the picture sub-elements and on (2) calculated results of the respective numeric values; and
   d) with the electronic processor, setting a brightness of the respective picture elements on the image to be output to the output device which has n gradations per picture element, the brightness setting being based on the detected number of picture sub-elements;
   wherein:
   1) the respective numeric values are such that floating-point values are represented by integers; and
   2) floating-point calculations are performed as integer calculations.

4. The method of claim 3, wherein:
   the respective numerical values have a virtual decimal point located in an intermediate position of an integer value, so as to constitute a virtual real number.

5. The method of claim 4, wherein:
   an integer part and a decimal part are located on a left-hand side and a right-hand side of the decimal point.

* * * * *